United States Patent
Martin et al.

(10) Patent No.: US 10,852,832 B2
(45) Date of Patent: Dec. 1, 2020

(54) SYSTEMS AND METHODS FOR POSITIONAL TRACKING IN A VIRTUAL REALITY SYSTEM

(71) Applicant: JANUS Research Group, Inc., Evans, GA (US)

(72) Inventors: Joseph S. Martin, Martinez, GA (US); Rodney Roeber, Evans, GA (US)

(73) Assignee: JANUS Research Group, Inc., Evans, GA (US)

( * ) Notice: Subject to any disclaimer, the term of this patent is extended or adjusted under 35 U.S.C. 154(b) by 0 days.

(21) Appl. No.: 16/360,668

(22) Filed: Mar. 21, 2019

(65) Prior Publication Data

US 2019/0294250 A1    Sep. 26, 2019

Related U.S. Application Data

(60) Provisional application No. 62/646,063, filed on Mar. 21, 2018.

(51) Int. Cl.
  *G09G 5/00* (2006.01)
  *G06F 3/01* (2006.01)
  *G06F 3/0346* (2013.01)

(52) U.S. Cl.
  CPC ............ *G06F 3/016* (2013.01); *G06F 3/014* (2013.01); *G06F 3/0346* (2013.01)

(58) Field of Classification Search
  CPC .......... G06F 3/016; G06F 3/011; G06F 3/014; G06F 3/0346
  See application file for complete search history.

(56) References Cited

U.S. PATENT DOCUMENTS

| | | | |
|---|---|---|---|
| 6,870,526 B2 * | 3/2005 | Zngf .................. | G06F 3/014 345/156 |
| 9,201,508 B2 * | 12/2015 | Ham .................. | G06F 3/0236 |
| 9,658,693 B2 * | 5/2017 | Levesque ............. | G06F 3/011 |
| 10,025,386 B2 * | 7/2018 | Keller ................ | G06F 3/016 |
| 10,025,387 B2 * | 7/2018 | Keller ................ | G06F 3/014 |
| 10,488,932 B1 * | 11/2019 | Keller ................ | G06F 3/016 |
| 2010/0261526 A1 | 10/2010 | Anderson et al. | |
| 2012/0188158 A1 | 7/2012 | Tan et al. | |
| 2015/0293592 A1 | 10/2015 | Cheong et al. | |
| 2015/0358543 A1 | 12/2015 | Kord | |

(Continued)

FOREIGN PATENT DOCUMENTS

CN    205318322 U    6/2016

OTHER PUBLICATIONS

International Search Report issued in PCT Application Serial No. PCT/US2019/023368 dated Jun. 6, 2019.

(Continued)

*Primary Examiner* — Vijay Shankar
(74) *Attorney, Agent, or Firm* — Mark H. Whittenberger; Holland & Knight LLP

(57) ABSTRACT

The present disclosure relates to a wearable virtual reality positional tracking device. Embodiments may include a wearable glove and a plurality of inertial measurement unit (IMU)/microcontroller unit (MCU) pairs wherein each pair is located on the wearable glove. Each IMU/MCU pair may include a sensor configured to obtain positional information and provide that positional information to an inverse kinematics (IK) solver.

17 Claims, 19 Drawing Sheets

(56) References Cited

U.S. PATENT DOCUMENTS

| | | |
|---|---|---|
| 2016/0127664 A1 | 5/2016 | Bruder et al. |
| 2016/0246370 A1 | 8/2016 | Osman |
| 2016/0259408 A1 | 9/2016 | Messingher et al. |
| 2017/0038839 A1 | 2/2017 | Seth |
| 2017/0108929 A1 | 4/2017 | Sinko et al. |
| 2017/0296363 A1 | 10/2017 | Yetkin et al. |
| 2017/0322626 A1 | 11/2017 | Hawkes et al. |
| 2020/0019245 A1* | 1/2020 | Ganadas ................. G06F 3/014 |

OTHER PUBLICATIONS

International Search Report issued in PCT Application Serial No. PCT/US2019/023362 dated Jun. 6, 2019.
Non-Final Office Action issued in U.S. Appl. No. 16/360,644 dated Jan. 22, 2020.

* cited by examiner

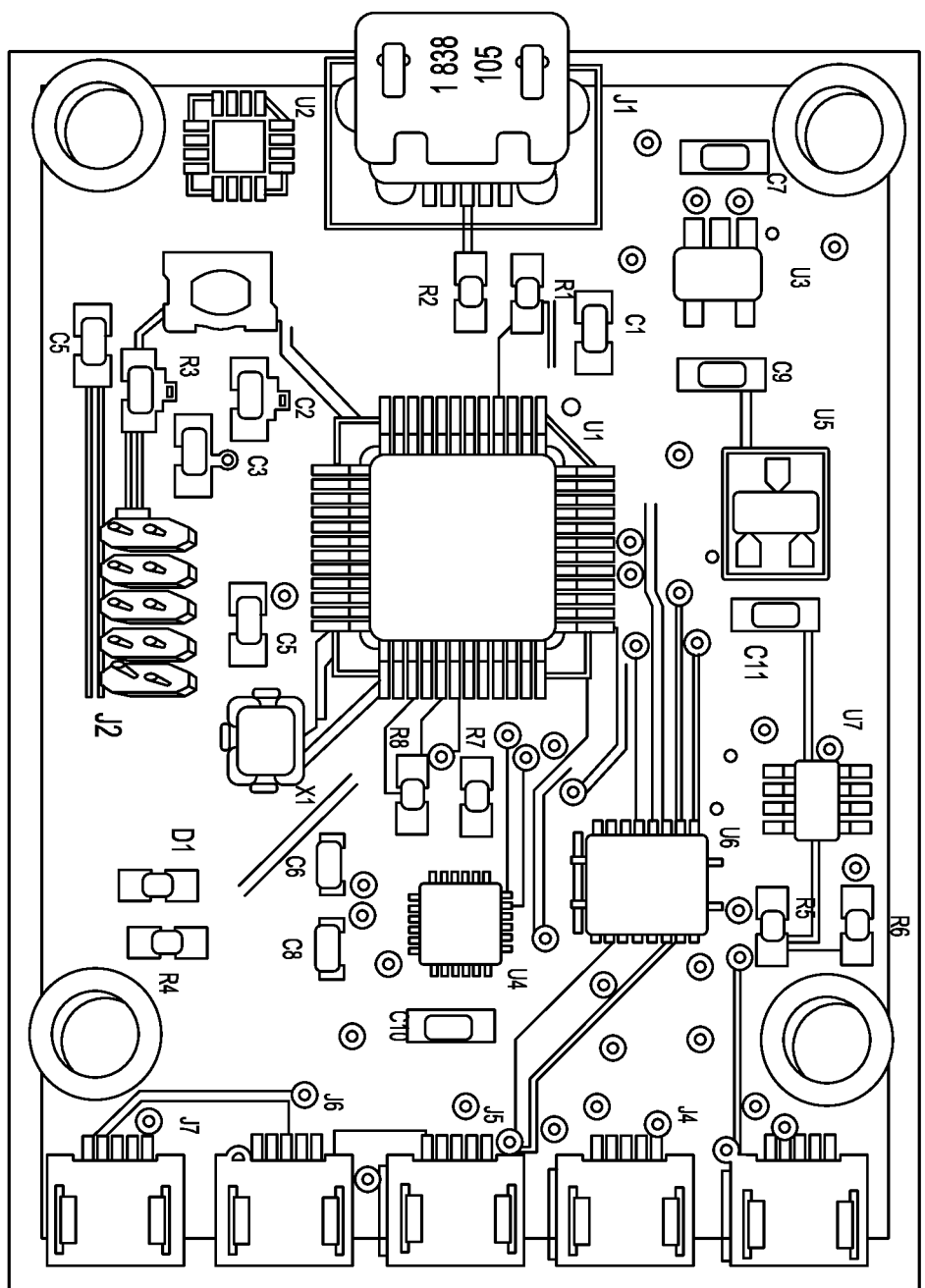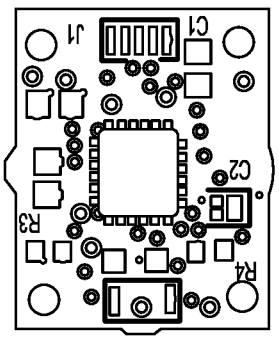
*FIG. 8*

| State | Entry Conditions | Transition Condition | Transition Actions |
|---|---|---|---|
| STARTUP | Aurora memory and registers are initialized. NB_0: Floating HIGH NB_1: Floating HIGH I2C Module: Inactive | Either NB_0 or NB_1 transitions HIGH-to-LOW | Assign the NB that transitioned as the US_NB. Assign the NB that did not transition as the DS_NB. Pull the DS_NB LOW. STATE = RESET |
| RESET | US_NB: Pulled LOW by upstream device DS_NB: Pulled LOW by this device. I2C Module: Inactive | US_NB transition LOW-to-HIGH | Enable the I2C module as an I2C Slave with address 0x7F. |
| SETUP | US_NB: Floating HIGH DS_NB: Pulled LOW by this device. I2C Module: Active as I2C slave with address 0x7F. | Unique I2C address assigned | Reset the I2C module as an I2C slave with the unique address that the controller assigns. Release DS_NB so that it floats HIGH. |
| ACTIVE | US_NB: Floating High DS_NB: Floating HIGH I2C Module: Active as I2C slave with address 0x7F. | DS_NB signal requests controller action. | Emit status signal to upstream neighbor. Monitor status signal from downstream neighbor. |

FIG. 12

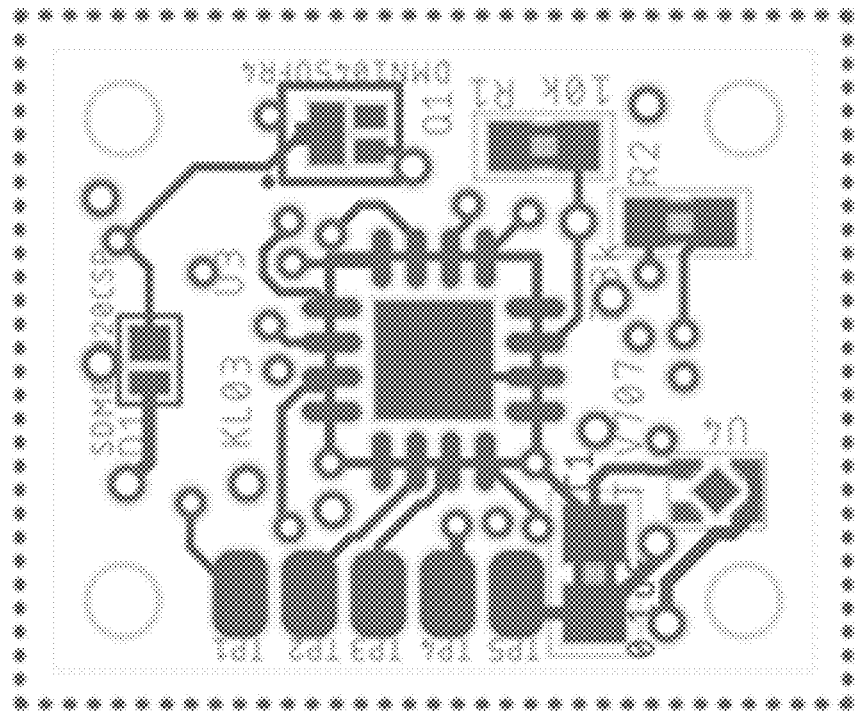
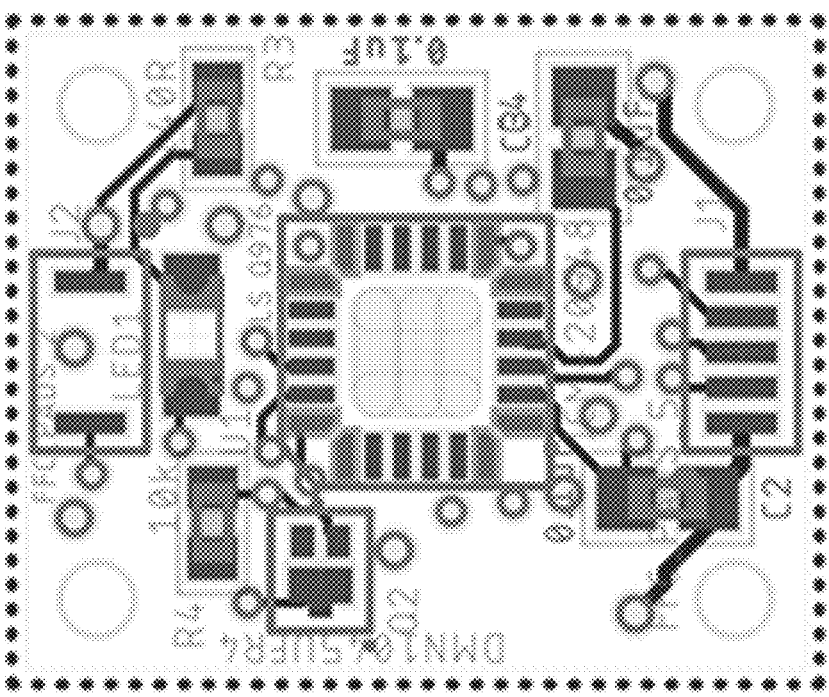
FIG. 18

SYSTEMS AND METHODS FOR POSITIONAL TRACKING IN A VIRTUAL REALITY SYSTEM

RELATED APPLICATION

This application claims the benefit of U.S. Provisional Application No. 62/646,063, filed on 21 Mar. 2018; the contents of which are incorporated herein by reference.

FIELD OF THE INVENTION

The embodiments of the invention generally relate to design methods for positional tracking in a virtual reality system.

BACKGROUND

Virtual reality systems generally allow for computer-generated interactive experiences that may occur within a simulated environment. Existing VR technology commonly uses headsets or multi-projected environments, sometimes in combination with physical environments, to generate realistic images, sounds, and other sensations that simulate a user's physical presence in a virtual or imaginary environment.

SUMMARY

In one or more embodiments of the present disclosure, a wearable virtual reality positional tracking device is provided. In some embodiments the device may include a wearable glove and a plurality of inertial measurement unit (IMU)/microcontroller unit (MCU) pairs wherein each pair is located on the wearable glove. Each IMU/MCU pair may include a sensor configured to obtain positional information and provide that positional information to an inverse kinematics (IK) solver.

One or more of the following features may be included. In some embodiments, each IMU may include a 9-degree of freedom IMU. In some embodiments, three IMU/MCU pairs may be located on each digit of the wearable glove. The device may include a microcontroller including an inter-integrated circuit (I2C) communications module and at least one general purpose input/output (GPIO) pin. The microcontroller may utilize a communications protocol configured to enable exception processing, fault recovery, and device hot-swapping. The communications protocol may be configured to assign a unique address to each sensor. An additional IMU/MCU pair may be located on a wrist area of the wearable glove. The wearable glove may include one or more light sources configured to communicate with an imaging device. The imaging device may utilize a real-time time-of-flight (TOF) calculation of one or more tracked points. The imaging device may utilize pulse encoded lighting to differentiate tracked points.

In one or more embodiments of the present disclosure a virtual reality positional tracking method is provided. The method may include providing a wearable glove and attaching a plurality of inertial measurement unit (IMU)/microcontroller unit (MCU) pairs on the wearable glove, wherein each IMU/MCU pair includes a sensor. The method may include obtaining positional information using the sensor and providing that positional information to an inverse kinematics (IK) solver.

One or more of the following features may be included. In some embodiments, each IMU may include a 9-degree of freedom IMU. In some embodiments, three IMU/MCU pairs may be located on each digit of the wearable glove. The device may include a microcontroller including an inter-integrated circuit (I2C) communications module and at least one general purpose input/output (GPIO) pin. The microcontroller may utilize a communications protocol configured to enable exception processing, fault recovery, and device hot-swapping. The communications protocol may be configured to assign a unique address to each sensor. An additional IMU/MCU pair may be located on a wrist area of the wearable glove. The wearable glove may include one or more light sources configured to communicate with an imaging device. The imaging device may utilize a real-time time-of-flight (TOF) calculation of one or more tracked points. The imaging device may utilize pulse encoded lighting to differentiate tracked points.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The present invention is illustrated by way of example, and not limitation, in the figures of the accompanying drawings in which like references indicate similar elements and in which:

FIG. 8 illustrates a forearm/wrist positional sensor consistent with embodiments of the present disclosure;

FIG. 12 illustrates a network initialization controller consistent with embodiments of the present disclosure;

FIG. 18 illustrates an example physical schematic for position tracker board consistent with embodiments of the present disclosure.

DETAILED DESCRIPTION

Figure 1:
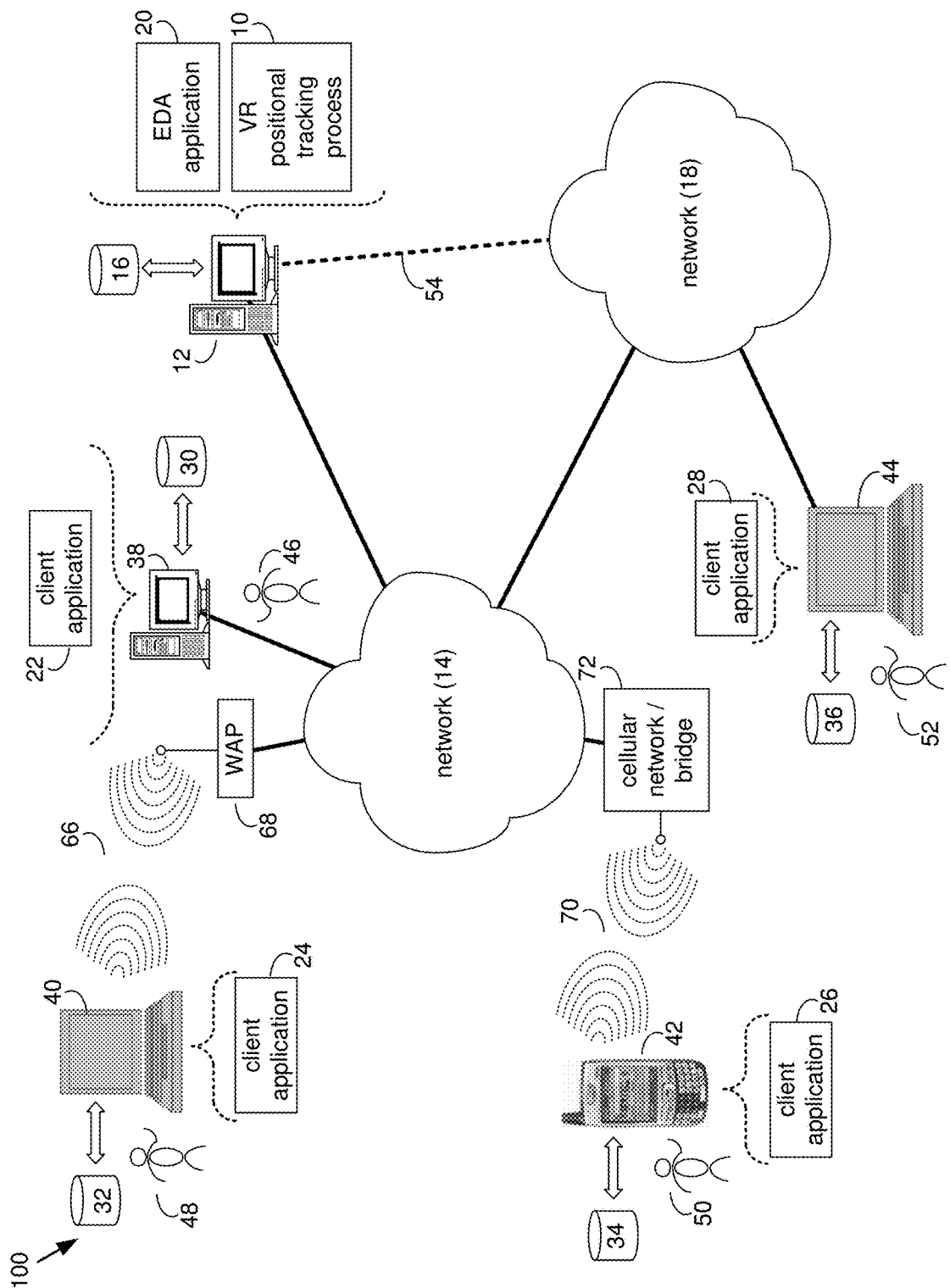
FIG. 1 illustrates a block diagram of an exemplary system for VR based positional tracking in accordance with embodiments of the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown a virtual reality positional tracking process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, virtual reality positional tracking process 10 may reside on and be executed, in whole or in part, by a client electronic device, such as a personal computer, notebook computer, personal digital assistant, or the like.

The instruction sets and subroutines of virtual reality positional tracking process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Virtual reality positional tracking process 10 may be a stand alone application, or may be an applet/application/ script that may interact with and/or be executed within EDA application 20. In addition/as an alternative to being a server-side process, virtual reality positional tracking process 10 may be a client-side process (not shown) that may reside on a client electronic device (described below) and may interact with an EDA client application (e.g., one or more of EDA client applications 22, 24, 26, 28). Further, virtual reality positional tracking process 10 may be a hybrid server-side/client-side process that may interact with EDA application 20 and an EDA client application (e.g., one or more of client applications 22, 24, 26, 28). As such, virtual reality positional tracking process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize virtual reality positional tracking process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
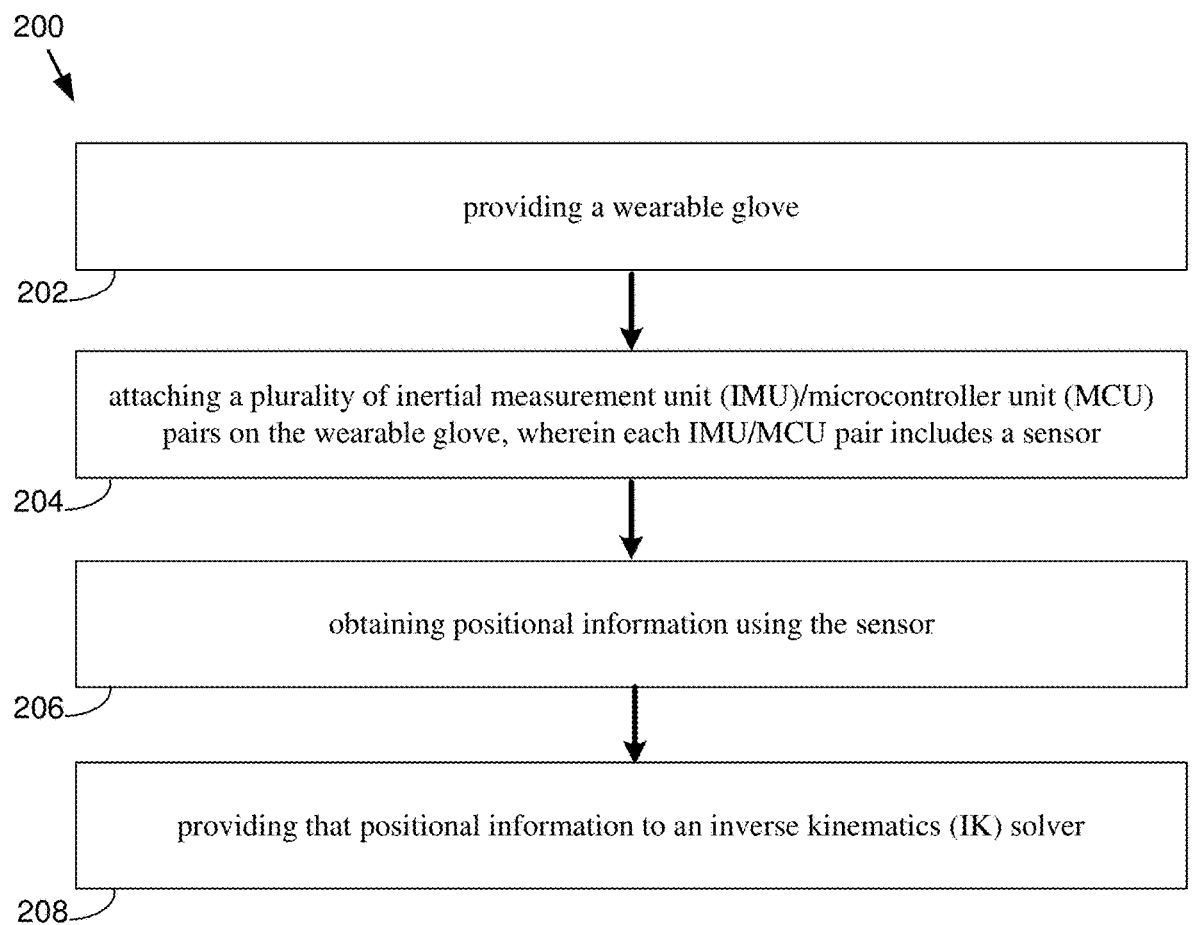
FIG. 2 illustrates a flowchart showing operations consistent with embodiments of the present disclosure.

Referring now to FIG. 2, an exemplary flowchart 200 depicting operations consistent with virtual reality positional tracking process 10 is provided. Operations may include providing (202) a wearable glove and attaching (204) a plurality of inertial measurement unit (IMU)/microcontroller unit (MCU) pairs on the wearable glove, wherein each IMU/MCU pair includes a sensor. The method may include obtaining (206) positional information using the sensor and providing (208) that positional information to an inverse kinematics (IK) solver.

Referring now to FIGS. 3-19, embodiments of virtual reality positional tracking process 10 are provided. Embodiments of the present disclosure are designed to be both modular and composable, allowing individual components to be mixed and matched depending on the needs of the training system. Embodiments included herein are capable of procedurally generating highly-detailed virtual environments in real-time, making it suitable for near instant transmission.

In some embodiments, virtual reality positional tracking process 10 may include a real-time haptics mapping engine and toolset for MR/VR training simulations. In some embodiments, a point-of-need delivery service is included that may be used for simulated, high-fidelity, training environments through the use of MR/VR and Haptic surrogates. In some embodiments, a cross-platform, high-performance, high-fidelity, scalable presentation client is included that may be capable of supporting real-time haptics mapping in simulated training environments.

In some embodiments, virtual reality positional tracking process 10 may include a positional tracking, synthetic proprioception and haptic feedback system. Embodiments included herein may provide for improved 3D simulation training availability and effectiveness, significantly reduced capital costs associated with 3D motion simulation training systems, significantly improved motion tracking for more direct representation of physical interactions, and significant improvement to current state of the art initialization, calibration and setup.

Figure 3:
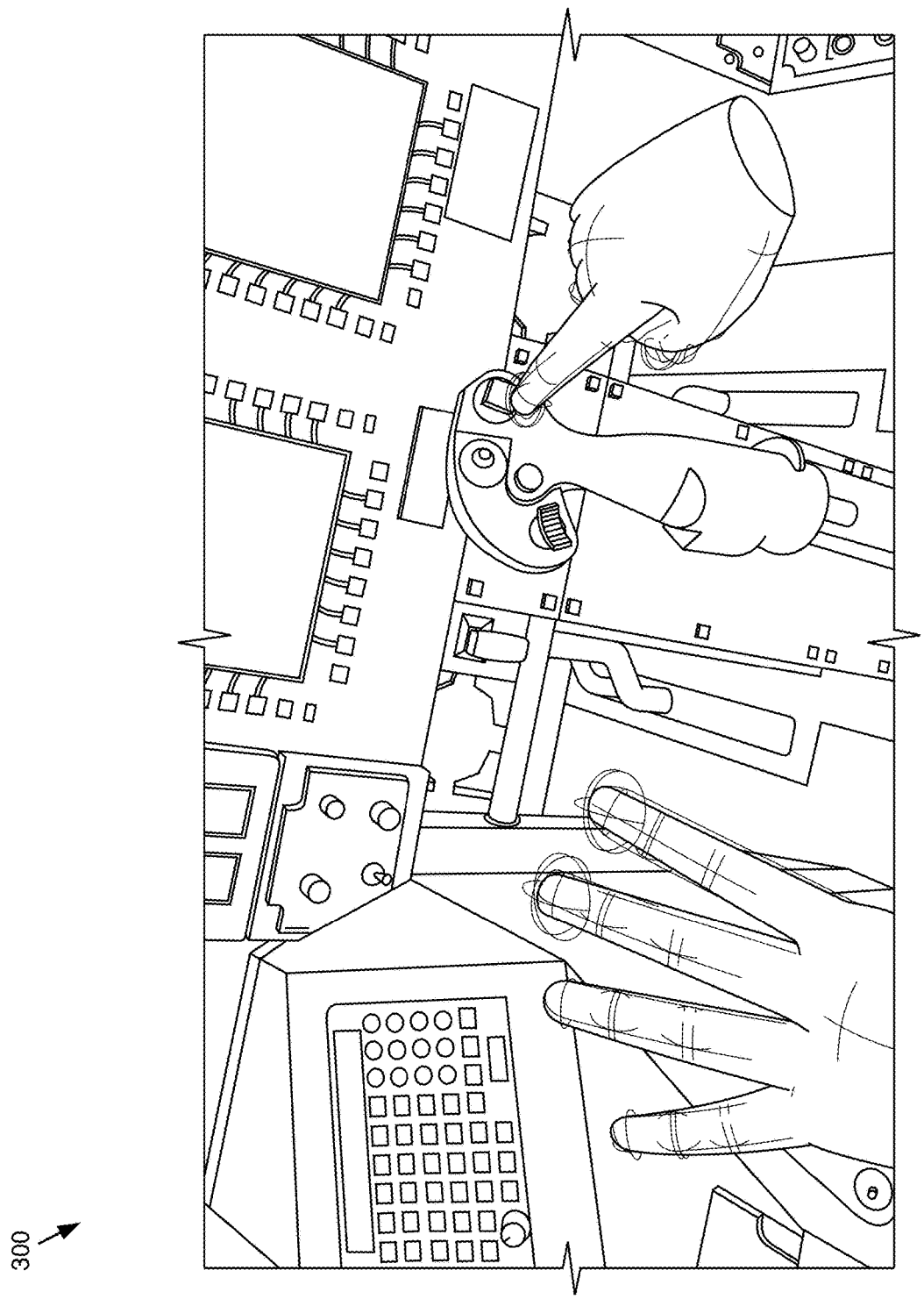
FIG. 3 illustrates an example VR system including a VR glove consistent with embodiments of the present disclosure.
Figure 4:
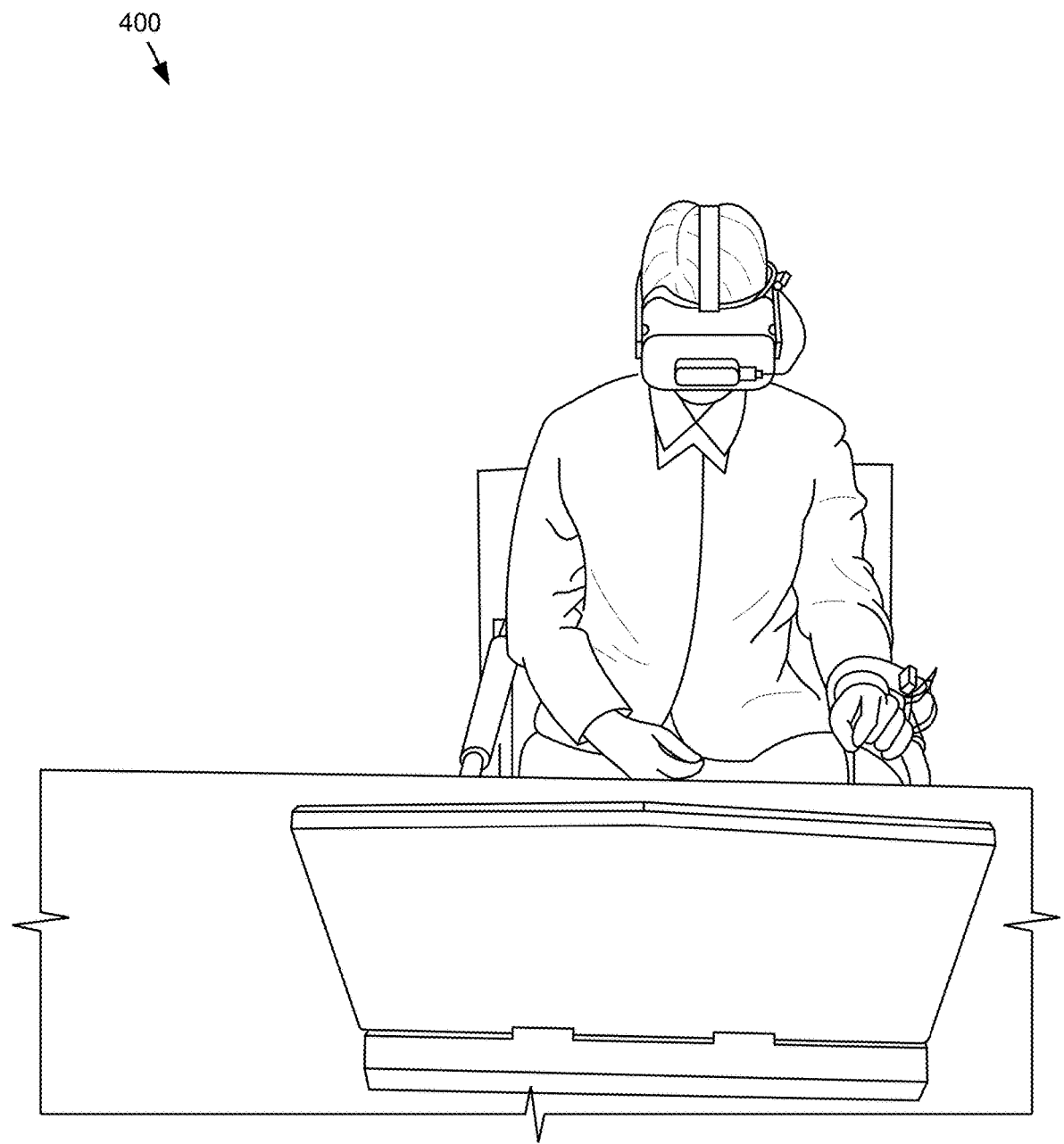
FIG. 4 illustrates an example VR system including a VR glove consistent with embodiments of the present disclosure.

Referring now to FIGS. 3-4, examples of a virtual reality positional tracking system where users may interact with platform components in a virtualized AH64D cockpit while receiving critical vibrotactile feedback. Accordingly, embodiments of virtual reality positional tracking process 10 may incorporate a series of interrelated components with silicone rings that provide finger-level tactile feedback. Initial development provided finger-level positional tracking through infrared sensors as well as through inertial measurement unit (IMU) sensors that may be configured to track arm, hand and finger positions even while the user's hands are not in view of the head-mounted display (HMD).

Embodiments included herein are directed towards VR systems and devices such as the glove discussed in further detail below. Embodiments of the VR glove described herein include a mature, robust and modular haptic feedback and finger-level positional tracking system (both hardware and software) that may be integrated with any selected VR or AR system with gaming or simulation (training intent).

In some embodiments, virtual reality positional tracking process 10 may utilize a paired Inertial Measurement Unit (IMU) and microcontroller unit (MCU) set to perform real time positional tracking. This paired set may allow for custom firmware at the point of detection that includes IMU interface code, filtering and all of the data handling required to complete a functioning positional tracking system.

In some embodiments, the IMU may include a MEMS 10DOF motion sensor that includes a nine axis, gyroscope, accelerometer and compass as well as a thermal sensor used for calibration. The MPU may include a small QFN chipset in a 3×3×1 mm package that incorporates two dies within the chipset one for the gyro and accelerometer and the other for the compass.

In some embodiments, the MCU and IMU may be included on a single printed circuit board (PCB) that is small enough to locate on one segment of each digit of the hand. By design this allows three IMU/MCU sets per digit for a total of 15 per hand. The following diagram (FIG. 5) shows the typical location of the sensors. These positions correlate with the ideal location for the Inverse Kinematic (IK) calculation positions. Inverse Kinematics, as used herein, relates to the mathematical process of recovering the movements of the hand/fingers in the virtual world from the sensor input of the motion sensor. In some embodiments, inverse kinematics makes use of the kinematics equations to determine the joint parameters that provide a desired position for each of the user's end-effectors. Once the user's hands/fingers motions are determined from the IMU sensor tracker (or other external positional sensor), they can be used to determine where to connect the user's hands/fingers to the world.

Figure 5:
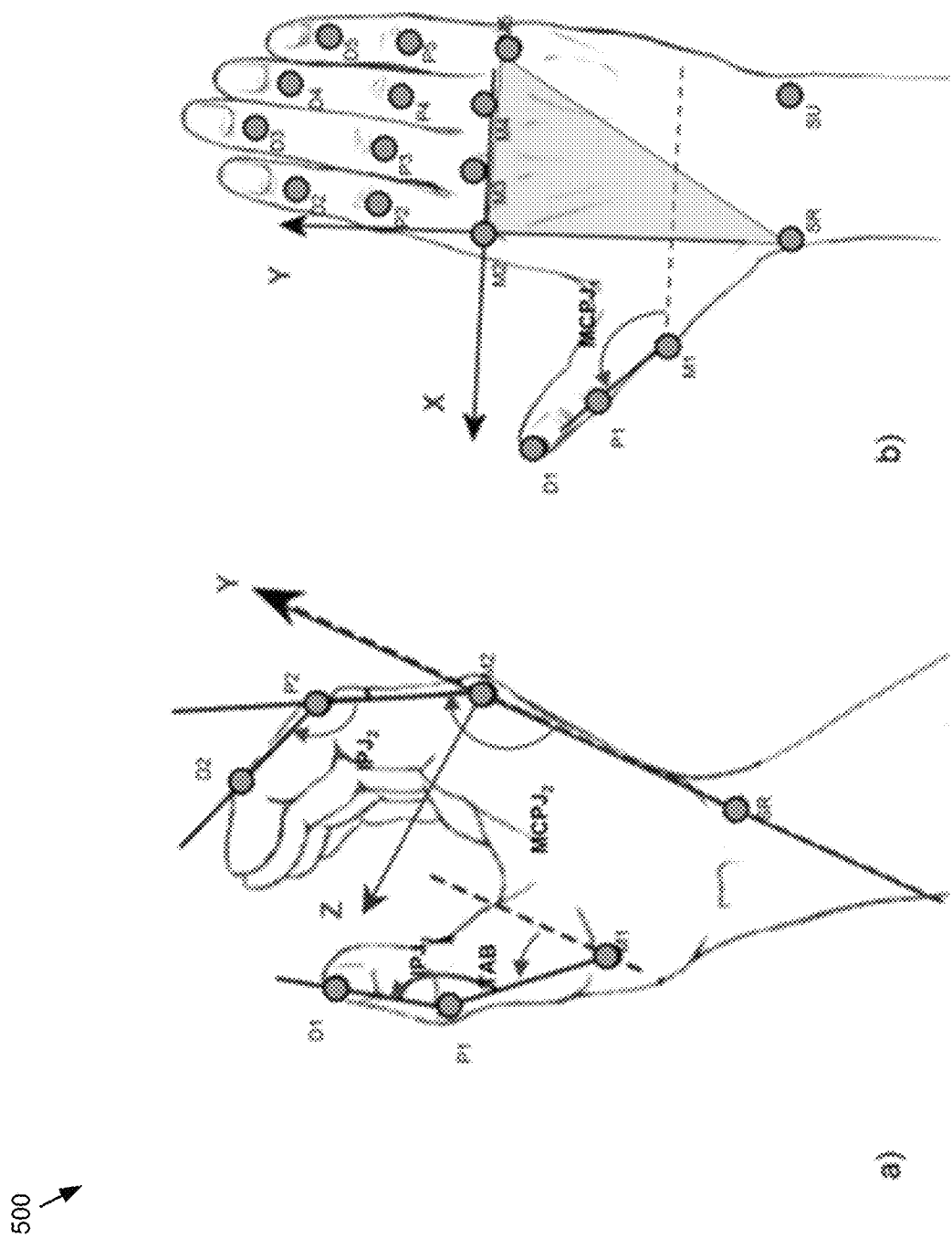
FIG. 5 illustrates an example placement location for inverse kinematics driven hand control consistent with embodiments of the present disclosure.

FIG. 5 depicts an example showing the marker placement, hand local reference system and finger joint angles. Markers position. Mi: head of the metacarpal bone of finger i (i=1-5); Pi: head of proximal phalanx of finger i (i=1-5); Di: head of distal phalanx of the thumb (i=1) and head of middle phalanx of long fingers (i=2-5); SU: styloid process of ulna; SR: styloid process of radius. Local reference system XYZ. The origin is in correspondence of the marker M2. Vectors (M2-M5) and (M2-SR) define the metacarpal plane of the hand (grey triangle). Z-axis is normal to the metacarpal plane pointing palmarly, Y-axis has the direction of vector (M2-SR) pointing distally, while X-axis is calculated as the cross-product of Y and Z-axis, pointing radially. Joint angles in transverse plane YZ (a) and in sagittal plane XY (b) of the hand. MCPJT: metacarpophalangeal joint flexion angle of finger i (i=1-5); IPJi: proximal interphalangeal joint flexion angle of finger i (i=1-5); TAB: thumb abduction angle. MCPJi (i=2-5) is defined as the angle between Y-axis and the projection of the vector (Pi-Mi) on the YZ plane; IPJi (i=2-5) is the angle between the projections of vectors (Di-Pi) and (Pi-Mi) on the YZ plane. TAB is the angle between the vector (P1-M1) and the XY plane. MCPJ1 is the angle between X-axis and the projection of vector (P1-M1) on the XY plane. IPJ1 is the angle between vectors (D1-P1) and (P1-M1).

Figure 6:
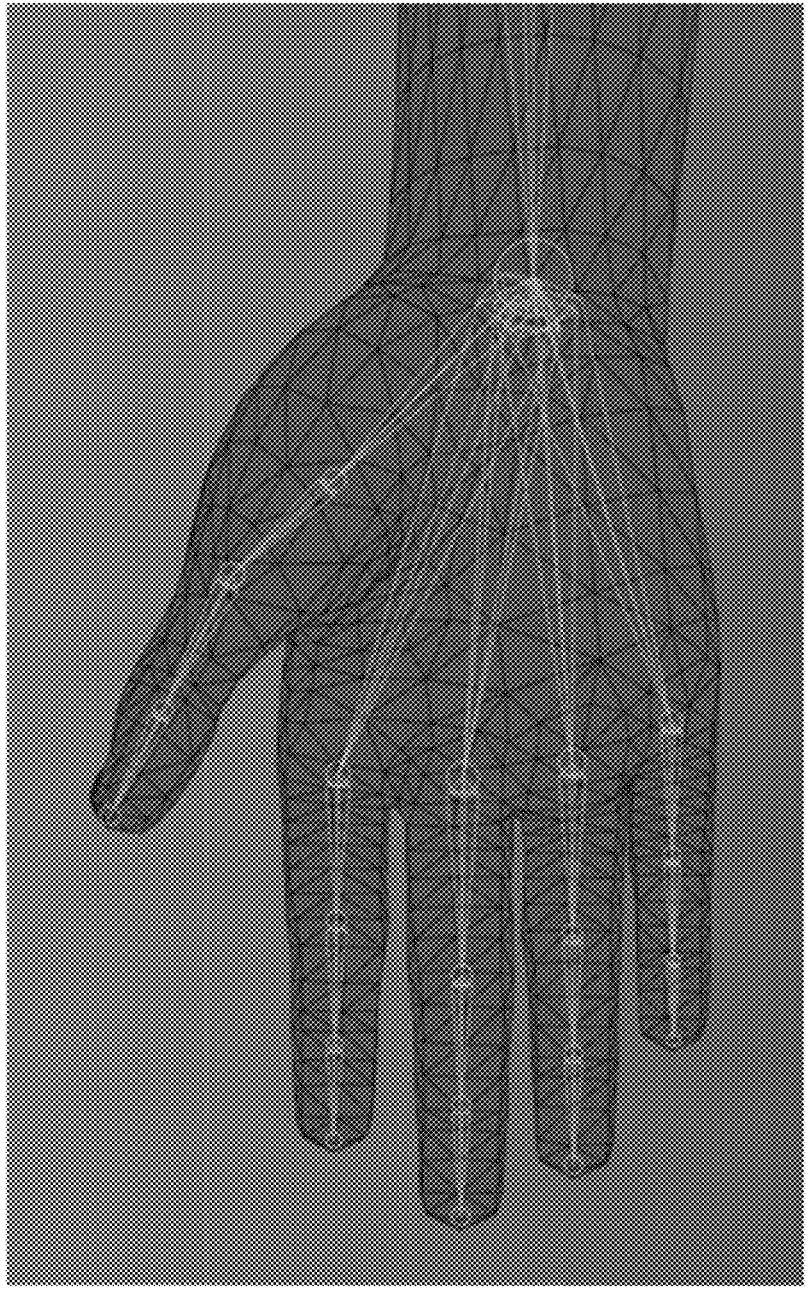
FIG. 6 illustrates an example high resolution 3D skeletal bone structure for inverse kinematic driven hand control.

Following this schema, embodiments included herein have adopted a high resolution skeletal bone structure within our bipedal (human) models which corresponds to the marker placement reference. FIG. 6 depicts a high resolution 3D skeletal bone structure for Inverse Kinematic (IK) driven hand control. With an Inverse Kinematics (IK) approach, embodiments included herein may be configured to use the motion tracking IMU sensor (or other positional data) to move an IK handle on the fingertip to pose the entire joint chain (a joint chain that has an IK handle is called an IK chain). In this way, as the user moves their hands/fingers the IK solver automatically rotates all the joints in the IK chain. The IK solver may be used to calculate the rotations of all the joints in the IK chain as the user moves their hands/fingers. The high level per sensor design is shown in FIG. 7.

Figure 7:
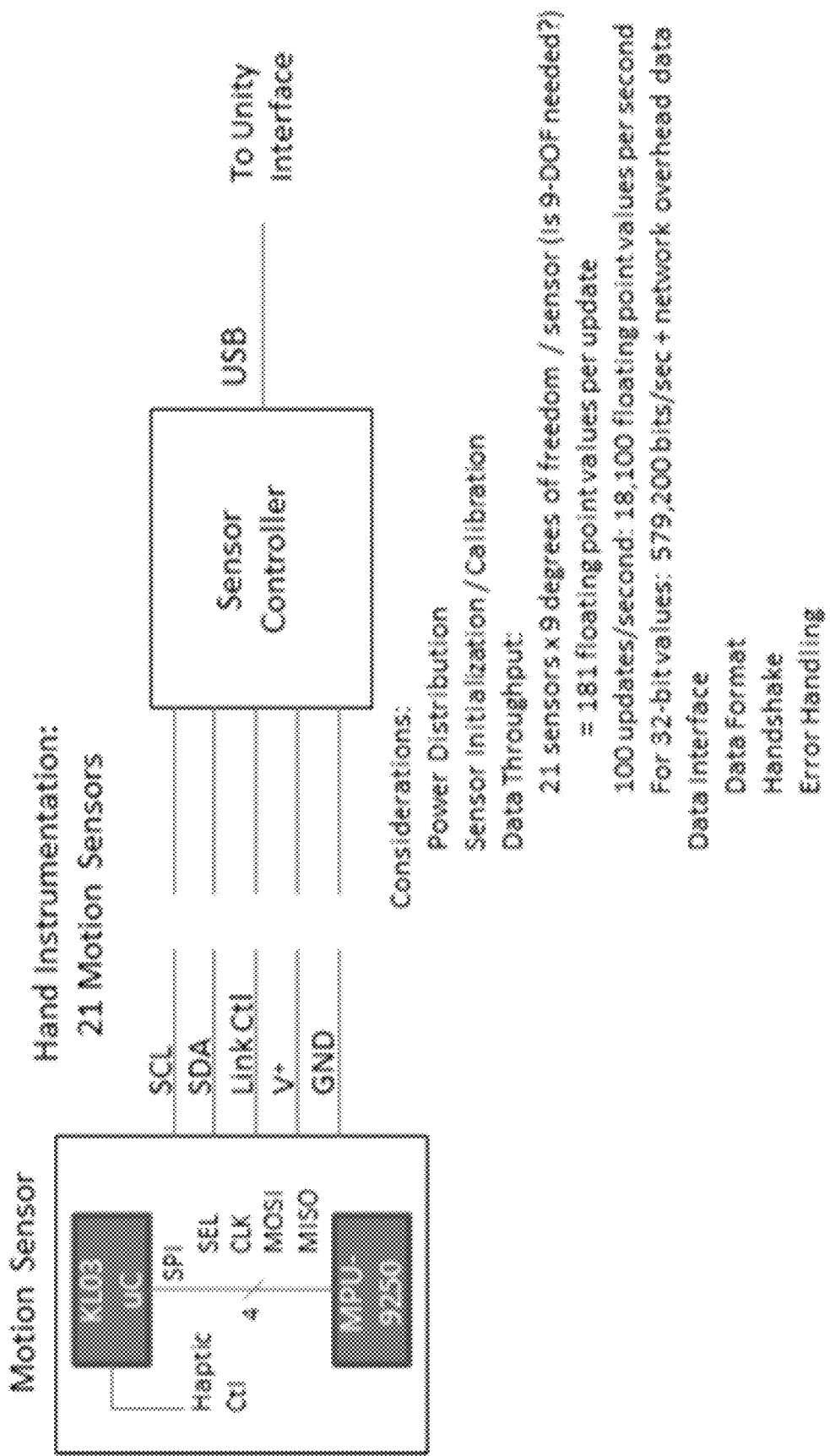
FIG. 7 illustrates a schematic of a sensor network interface consistent with embodiments of the present disclosure.

As shown in FIG. 7, the motion sensor may be a unified tracking, haptics feedback, communications and computing/processing device. The MCU may be placed and/or collocated with the IMU/MPU and connectivity between sensors utilizes an enhanced protocol while connectivity to subordinate devices such as the haptic feedback, or IMU/MPU can be made with standard electronics connectivity methods such as I2C and SPI. An example of the forearm/wrist controller and individual sensor components is provided in FIG. 8.

In some embodiments, the present disclosure may provide continuous calibration through pulse encoded LED illuminator tracking. While the use of MCU/IMU based motion tracking does allow for high speed tracking of points and skeletal system through the use of properly positioned points there are several aspects of the design that are not ideal. The first aspect is the initialization calibration at startup that needs to be done to correlate the IMU points to a skeletal system. Simple "games" have been developed that increase in fidelity and refinement that allow the user to gradually calibrate the system. While this progressive calibration may be effective and works well for most users, it can be time consuming. The second issue with IMU based image trackers is related to drift of the location either through cumulative delta position offset errors such as a floating point rounding or significant digits error, or an error due to external inputs such as drift caused by changing thermals of the chipset itself. In testing the IMU may exhibit this issue after approximately an hour of continuous use. When the drift occurs, re-calibration may be required.

Accordingly, to resolve these two negative aspects of the IMU based motion capture system additional inputs to the system may be used both for correction and real-time recalibration. These typically involve IR emitters at the camera and IR reflective light sources placed strategically on the subject. This requires both high output IR illumination and high speed camera systems, traditionally more than eight imagers to resolve high resolution marker points in a 3D volume.

Figure 9:
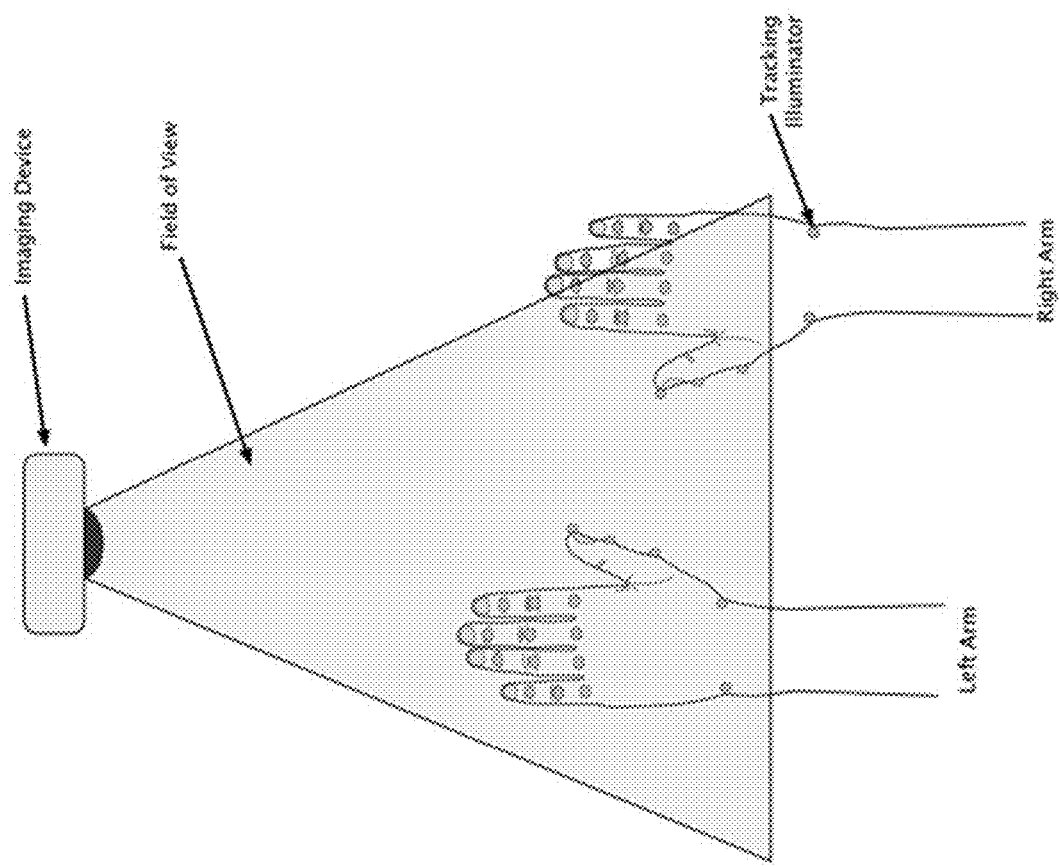
FIG. 9 illustrates an example of real-time position tracking and continuous calibration consistent with embodiments of the present disclosure.

Referring now to FIG. 9, an embodiment consistent with virtual reality positional tracking process 10 is provided. This example differs from those above in several ways. First, there is no assumed fixed imaging device network setup whose position is determined a priori. Second, this approach doesn't assume that there will be any emitters on the imaging device(s) that will be assisting the calibration process. Finally, this approach uses a pulse encoded free space optical transmission to quickly identify position tracker uniquely to each point in space. This approach capitalizes on the pre-existing deployment of a time of flight (ToF) tracking system that could be used in conjunction with the IMU based system, but may utilize an imaging sensor with sensitivity to the specific wavelength of emitted light from prepositioned LEDs on the tracking units themselves. When the points are in the field of view (FOV) of the imager they may be identified, their relative positions may be calculated either through multiple imagers whose relative 3D locations may be determined at the initial calibration time, or through the use of Time of Flight (ToF) imaging devices that may calibrate through either fixed location or mounting on the body. The key with this approach is that the system may be constantly readjusting opportunistically as the pulsed illuminators come in and out of view of any acceptable calibration imaging technology.

In some embodiments, the pulse encoding for transmission is a form of open space visible or non-visible (Infrared) communications channel. This combined with both point tracking from the imager as well as the relative 3D space inverse calculations from these observed points allow the calibration to occur in real time. The onboard MCU may pulse an encoded signal that may be observed by the imaging device to determine which sensor the point represents. This can be accomplished quickly using high speed pulsed LED transmission in either visible light spectrum or IR spectrum depending on the desired imaging capture device. The calibration sequence can be periodically fired, or controlled by the host computer to assist in initial calibration. Once the system has determined the identify of an illuminated point a high speed tracking algorithm determines the 3D position an evaluates this against the expected 3D location that is continuously updated as part of the IMU tracking. If a discrepancy between the expected and observed location is found, adjustments can be made to coax the calibration data to a ground truth state, or in extreme cases, the user can be notified that a brief recalibration process may be required.

In some embodiments, the Inter-Integrated Circuit (I2C) protocol may be employed to connect many physically separated sensors. An addressing problem surfaces when several identical sensors may be connected on the same I2C bus. Sensors that have I2C interfaces typically have only one or two addresses. For example, the Invensense MPU-9250 Motion Tracking Device includes approximately sixteen MPU-9250 devices are needed to instrument a hand for virtual reality interfacing. However, the MPU-9250 only has two possible addresses. The MPU-9250 also has a Serial Peripheral Interface (SPI) capability. Using this interface, however, adds the complexity of requiring a separate chip select line for each sensor.

Figure 10:
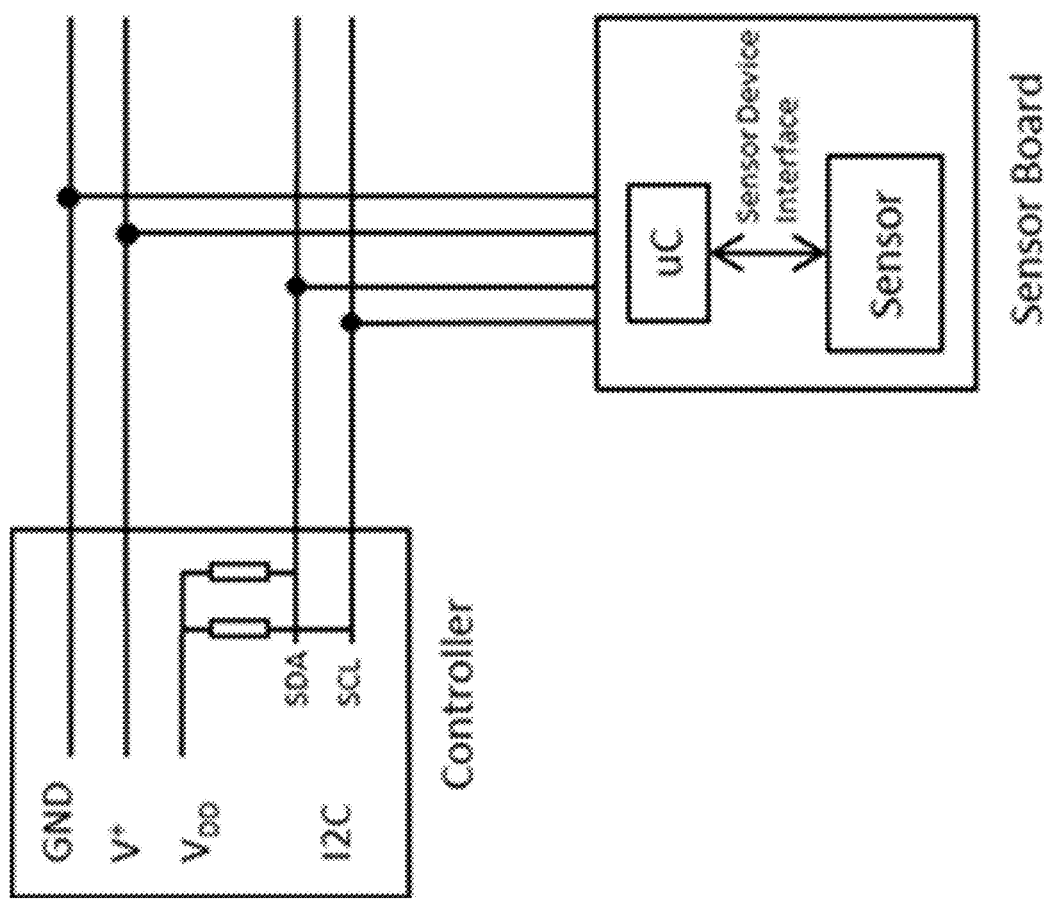
FIG. 10 illustrates an example of a generic sensor connection to I2C bus consistent with embodiments of the present disclosure.

Accordingly, a solution for using many sensors on a single I2C network is to incorporate a microcontroller interface as shown in FIG. 10, which depicts a generic sensor connection to an I2C Bus. The sensor board microcontroller may dedicate an I2C module for the controller bus and have additional resources to communicate with the sensor device. For the MPU-9250 example, the sensor board microcontroller may communicate on the controller network using I2C and communicate with the MPU-9250 sensor using SPI or I2C. In this arrangement, the sensor interface may be isolated from other network devices. This approach works well but becomes burdensome when connecting more than a few sensor boards. The scalability problem involves assigning a unique I2C address to each microcontroller. One method is to set the address by sensing General Purpose Input Output (GPIO) line settings at startup. Two pins dedicated for addressing may identify four microcontrollers. Three pins may identify eight microcontrollers and so on. This method takes additional microcontroller hardware resources and additional board space for biasing the pins. In another method, the address may be compiled directly into the executable code. Each microcontroller requires a unique executable file. Either method can easily work for small networks.

Figure 11:
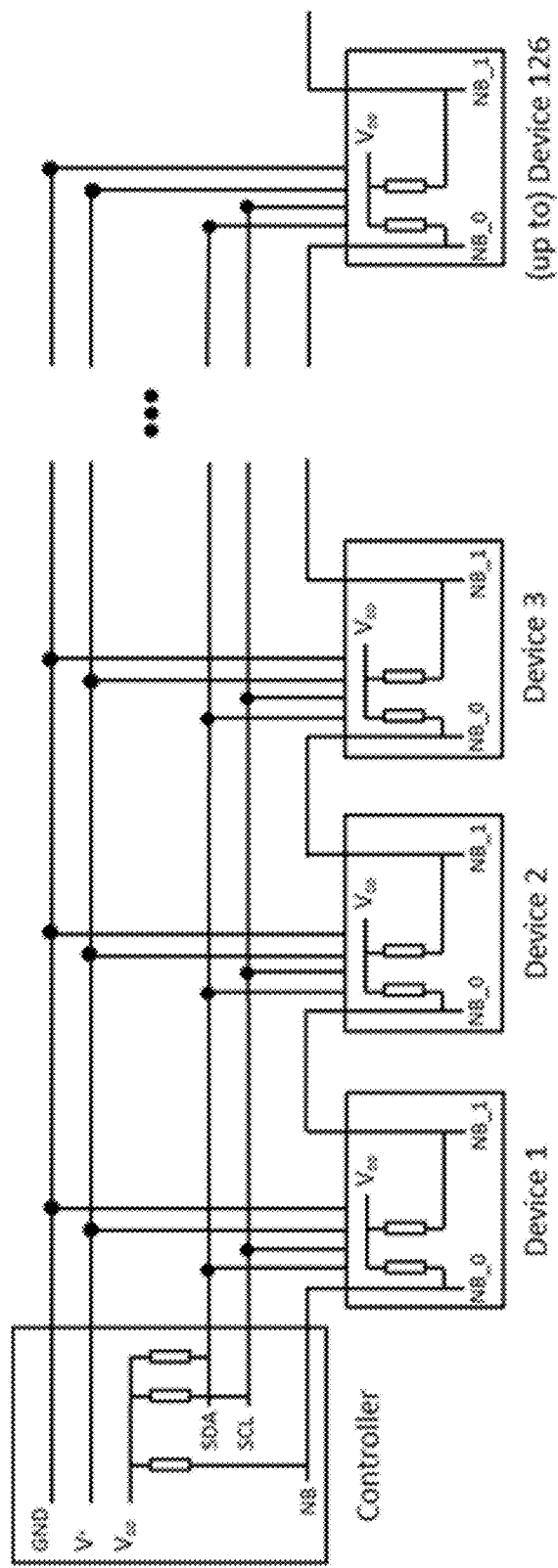
FIG. 11 illustrates an example network connection consistent with embodiments of the present disclosure.
Figure 13:
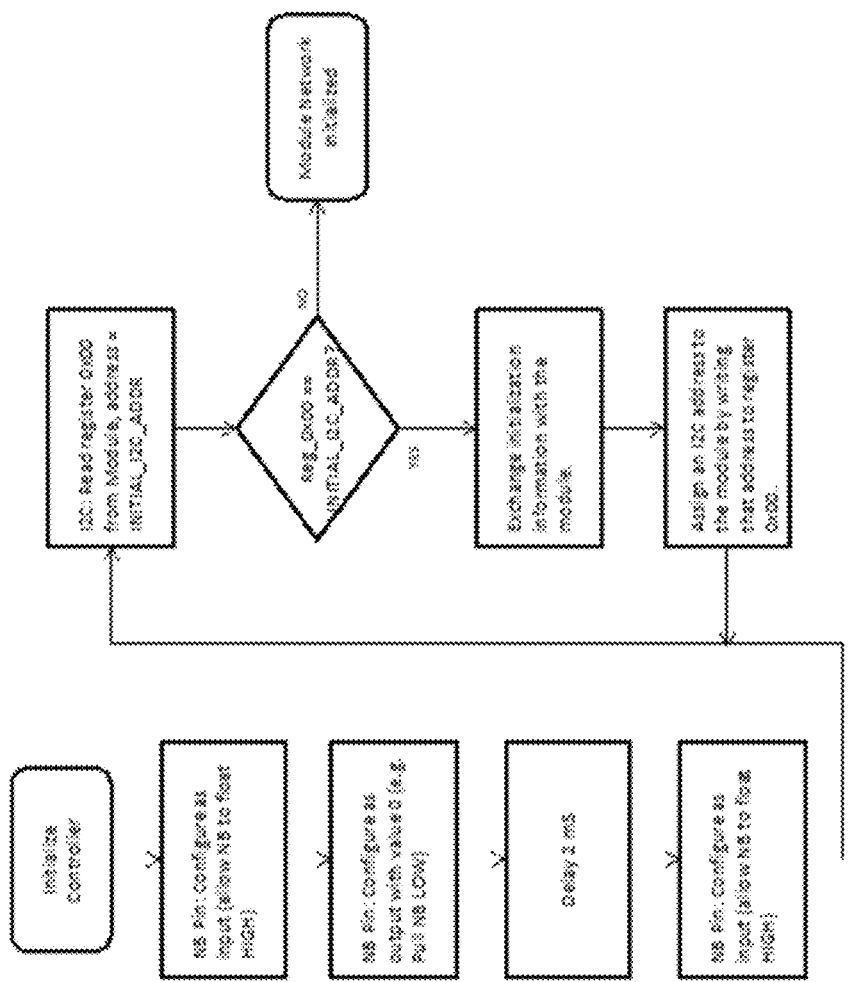
FIG. 13 illustrates a network initialization module consistent with embodiments of the present disclosure.
Figure 14:
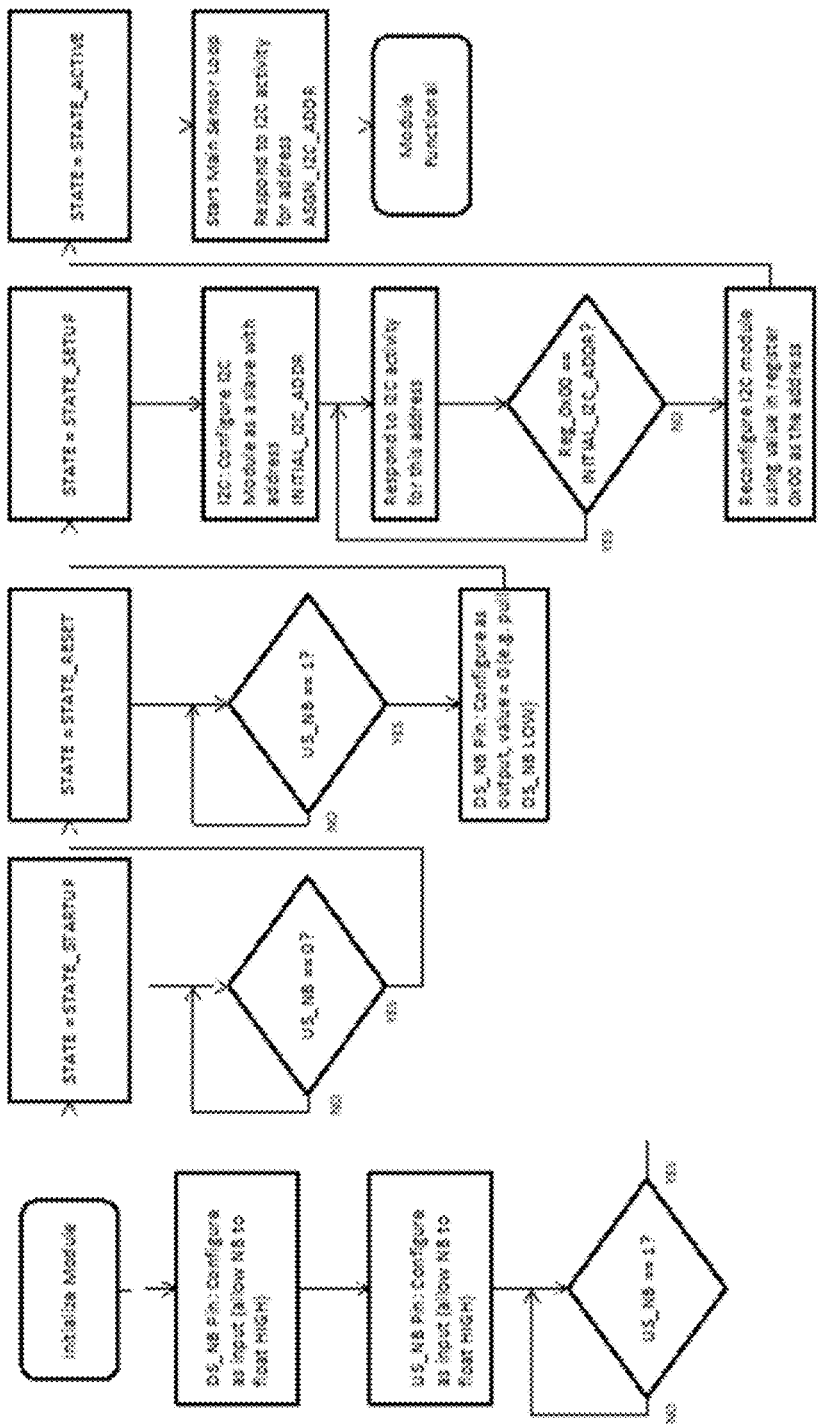
FIG. 14 illustrates example protocol states consistent with embodiments of the present disclosure.

In some embodiments, dynamically assigning I2C addresses in larger networks can be achieved by using an additional GPIO line and defining a suitable protocol. In addition to solving the scalability problem this protocol may also be used to enable exception processing, fault recovery, device "hot-swapping". Devices in accordance with the present disclosure may include a microcontroller including enough hardware resources to dedicate an Inter-Integrated Circuit (I2C) communications module and two General Purpose Input Output (GPIO) pins to implement the protocol. Embodiments included herein use a proprietary virtual reality communications protocol to assign a unique identifier to each device in the network. The architecture is shown in FIG. 11, which depicts an example network overview. The controller may be configured as an I2C master and the protocol may be implemented to assign a unique I2C address to each device. When network setup is completed the protocol may be used to manage network exceptions.

In some embodiments, the controller may use three signals to control the network. The Serial Data (SDA) and Serial Clock (SCL) are I2C lines that may be connected to each device and in a standard I2C network. The third signal may be a Neighbor Bus (NB) signal that connects to one of the two Neighbor Bus signals on Device 1. The other neighbor bus signal on Device 1 may be connected to one of the neighbor bus signals on Device 2. FIG. 11 shows Neighbor Bus 1 (NB_1) of one device connecting to NB_0 of the next device. This is not a constraint. Either neighbor bus of one device can connect to either neighbor bus of the next device. Devices may be connected in this manner to a maximum of 126 devices. The I2C 7-bit address space allows 128 addresses and addresses 0x00 and 0x7F may be reserved for the protocol. There may be additional addresses reserved by the I2C specification but those reservations are ignored by this protocol.

In some embodiments, the four states shown in FIG. 12, may be executed sequentially. When a network device is initialized it allocates five memory bytes to the protocol and enough memory for the controller and device to exchange information. The I2C module may not be active so it does not respond to I2C commands. Both of the neighbor bus pins may be configured as inputs so that the pull up resistors pull the neighbor bus signal HIGH. The controller may initiate the protocol by pulling its neighbor bus LOW. Device 1 detects this HIGH-to-LOW transition and assigns the pin on which the transition occurred as its upstream neighbor bus (US_NB). It assigns the other neighbor nus pin as its downstream neighbor bus (DS_NB). It sets its state to RESET and pulls its DS_NB LOW. This transition signals Device 2 to accomplish the same tasks and the action continues until all devices are in the RESET state. The controller may release its neighbor bus so that the signal floats HIGH. Device 1 detects this LOW-to-HIGH transition and initializes its I2C module as a slave device with address 0x7f. Device 1 sets its state to SETUP. All other devices remain in RESET. The controller may read the contents of Register 1 on the I2C slave that has address 0x7F. Since only Device 1 is configured with this address it responds by transmitting the value of Register 1. When the controller verifies the value, it marks Device 1 as PRESENT and transmits a unique I2C address to it. Device 1 detects that it received an address from the controller and reconfigures it I2C module as a slave with unique address. It sets its state to ACTIVE and releases its DS_NB. Device 2 recognizes the LOW-to-HIGH transition on its UP_NB and enters SETUP. The Controller again reads Register 1 from the slave device with address 0x7F. Since Device 2 is the only device with this address, it responds by sending the value of Register 1. Upon VR, the controller assigns a unique I2C address to Device 2. Device 2 reconfigures its I2C module with the new address and releases its DS_NB so that it float HIGH. This sequence continues until no device responds to the Controller's query to address 0x7F. All devices are ACTIVE. Devices in the ACTIVE state update register addresses with sensor values and respond to the controllers read and write commands.

In some embodiments, the protocol may be implemented in a single master I2C network; therefore, the slave devices cannot initiate I2C communications. Several methods are implemented by which a device can signal an exception. Embodiments included herein may implement the basic exception protocol to request action from the controller. When a device encounters a condition that warrants action from the controller it sends a 1 millisecond pulse on its US_NB. The upstream neighbor detects this pulse and sends a pulse on its US_NB. The pulse may propagate upstream until the controller receives the signal. The only information conveyed in the pulse is that one of the network devices requested servicing. The controller queries each device in priority order to determine which device initiated the exception.

In some embodiments, the basic exception protocol may not detect problems with downstream devices. It only responds to requests from downstream devices. For example, the basic protocol does not detect disabled devices such as physically disconnected or malfunctioning devices. Accordingly, an advanced exception protocol may be implemented to include downstream monitoring. Adding or replacing devices on an active network may be possible if the network implements an advanced exception protocol. When a device that implements the advanced exception protocol enters the Active state, it monitors its DS_NB for a signal and also sends a signal on its US_NB. When a device does not receive the expected signal on its DS_NB it may initiate an exception signal on its US_NB that is propagated to the controller. Different versions of the advanced exception protocol implement neighbor bus signaling that is appropriate for the network.

Figure 15:
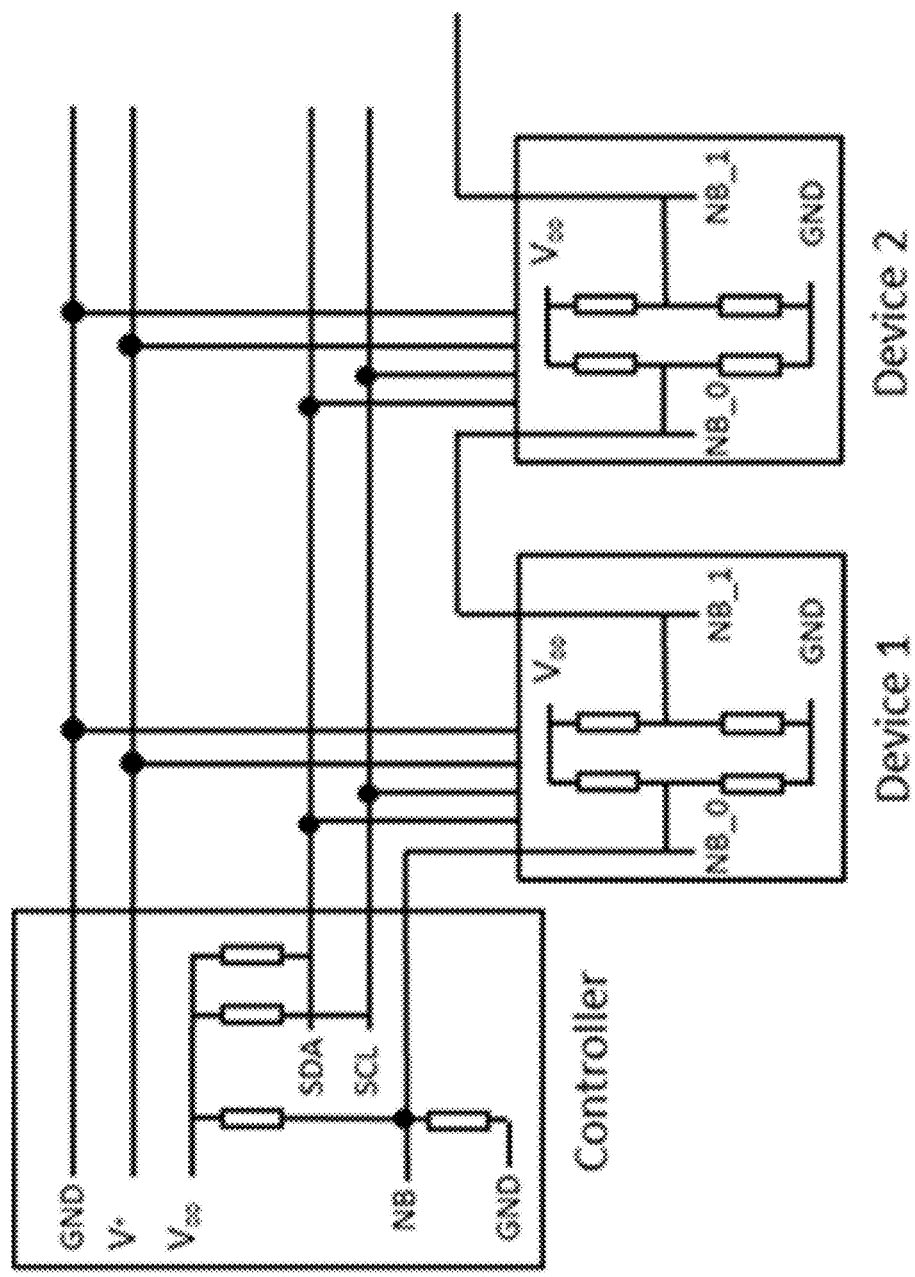
FIG. 15 illustrates an example of hardware neighbor bus signaling consistent with embodiments of the present disclosure.
Figure 16:
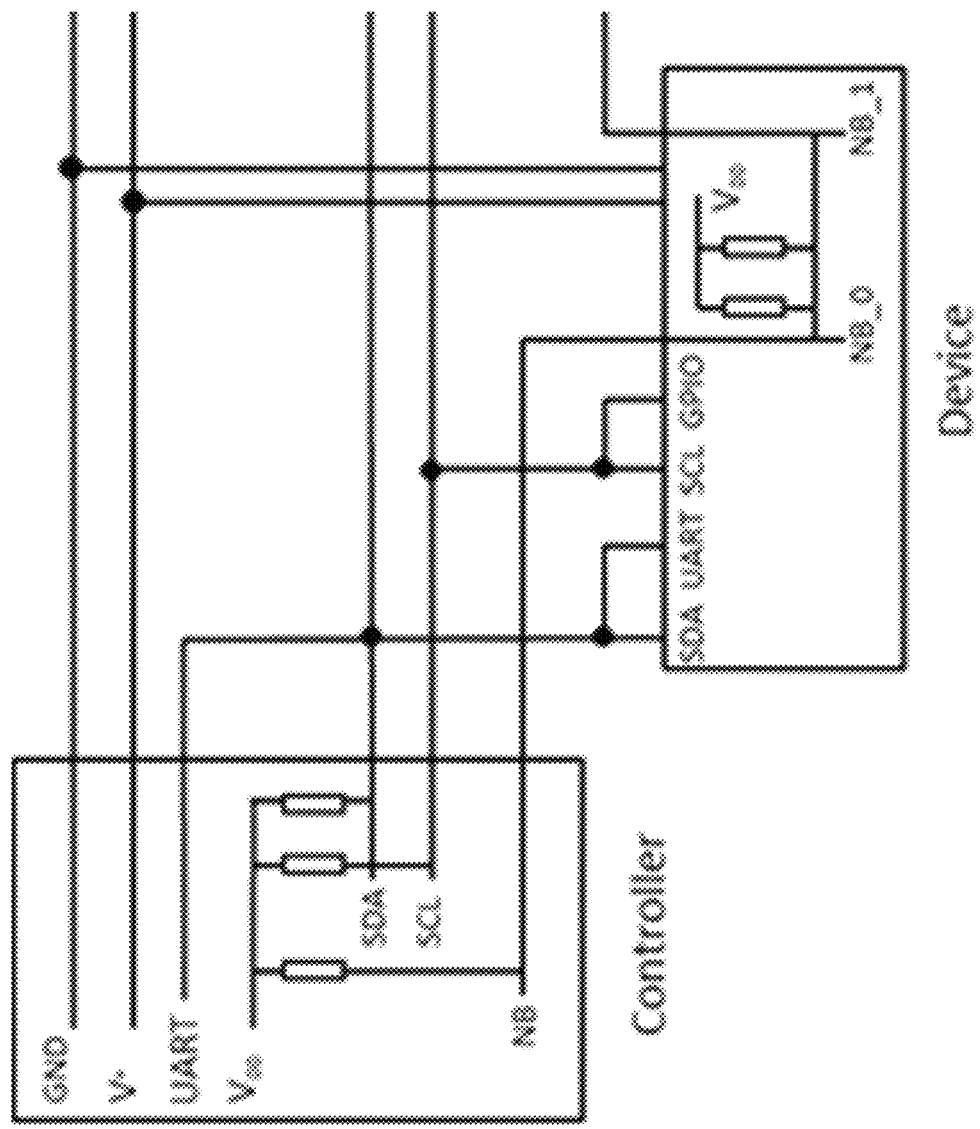
FIG. 16 illustrates an example asynchronous communication using the I2C data line consistent with embodiments of the present disclosure.
Figure 17:
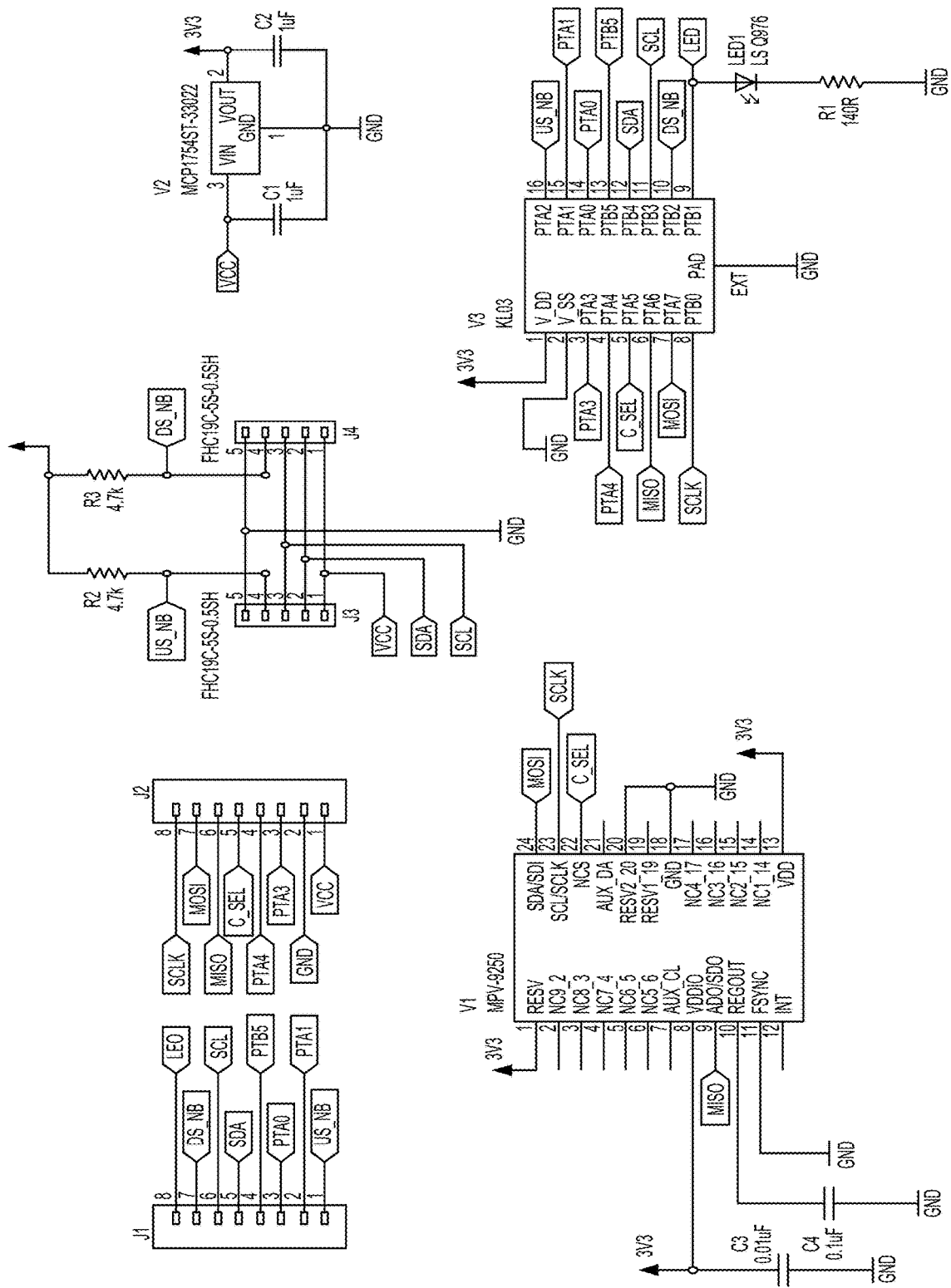
FIG. 17 illustrates an example electrical schematic for position tracker board consistent with embodiments of the present disclosure.
Figure 19:
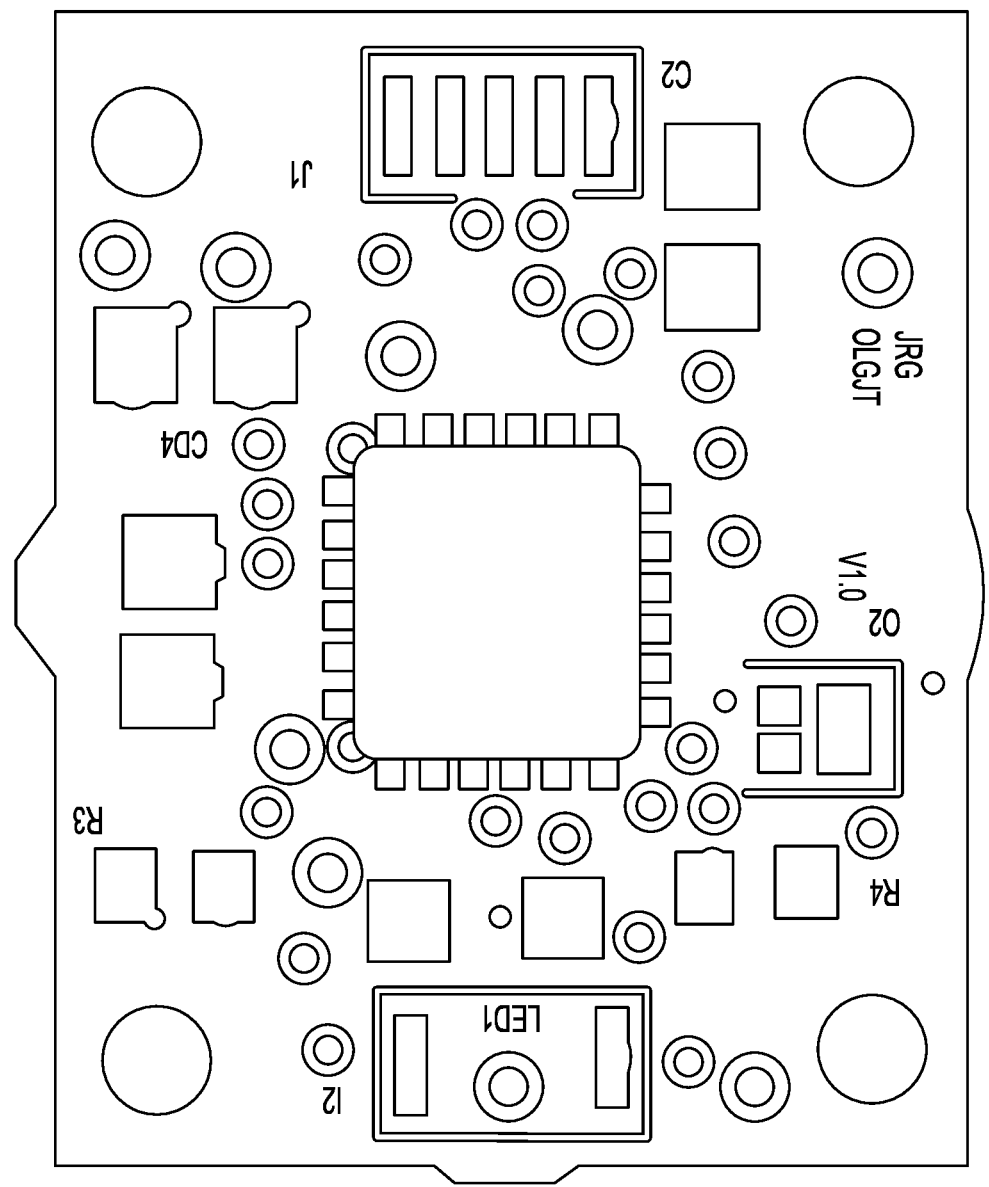
FIG. 19 illustrates an example position tracker board consistent with embodiments of the present disclosure.

In some embodiments, this signaling method uses a voltage divider on both the US_NB and the DS_NB of each device as shown in FIG. 15. The devices monitor the voltage on the DS_NB using an analog to digital converter or a comparator. When the expected voltage is not detected, a software exception signal is propagated to the Controller. This signaling can be used to accommodate "hot swapping" devices. When a device is removed from an active network, the controller may detect where the break occurs and discontinues polling devices beyond the break. When a device is reconnected, or added to the end of a network, the neighbor bus voltage level may be detected by the upstream neighbor that initiates an exception to the controller.

In some embodiments, several software signals can be implemented in the advanced exception protocol. The simplest is a periodic pulse that a device sends on its US_NB. The upstream neighbor detects the presence/absence of the signal and initiates an exception as required. A device watchdog timer can be implemented to monitor the signal's presence. A pulse width modulated signal may also be used by the advanced exception protocol. As with a pulse, the device monitors the presence/absence of a PWM signal with a specified duty cycle. PWM signals with differing duty cycles can be used to propagate more information than a single pulse can. A unique advanced exception protocol implementation is for a Device to interrupt the normal I2C traffic and communicate directly with the Controller. The Device may interrupt the normal I2C communications by using a GPIO to pull the I2C SCL line LOW. No I2C communication occurs when the clock is held LOW. In this condition the I2C data line is idle and can be used for simplex asynchronous communication. FIGS. 16-19, show an asynchronous communication using the I2C Data Line, an electrical schematic for position tracker board, a physical schematic for position tracker board, and a position tracker board respectively.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result.

The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

When implemented as an apparatus for performing the operations described herein, the apparatus may be specially constructed for the required purposes, or it may comprise a general-purpose computer selectively activated or reconfigured by a computer program stored in the computer. Such a computer program may be stored in a computer readable storage medium, any type of storage media or device suitable for storing electronic instructions, and each coupled to a computer system bus.

The processes presented herein are not inherently related to any particular computer or other apparatus. Various general-purpose systems may be used with programs in accordance with the teachings herein, or it may prove convenient to construct a more specialized apparatus to perform the operations described.

When implemented in software, the elements of the embodiments of the invention are essentially the program, code segments, or instructions to perform the tasks. The program, code segments, or instructions can be stored in a processor readable medium or storage device that can be read and executed by a processor or other type of computing machine. The processor readable medium may include any storage medium or storage device that can store information in a form readable by a processor or other type of computing machine. The program or code segments may be downloaded via computer networks such as the Internet, Intranet, etc. and stored in the processor readable medium or storage device.

The embodiments of the invention are thus described. While embodiments of the invention have been particularly described, they should not be construed as limited by such embodiments. The embodiments of the invention should be construed according to the claims that follow below.

What is claimed is:

1. A virtual reality positional tracking method comprising:
   providing a wearable glove;
   attaching a plurality of inertial measurement unit (IMU)/ microcontroller unit (MCU) pairs on the wearable glove, wherein each IMU/MCU pair includes a sensor;
   obtaining positional information using the sensor;
   providing that positional information to an inverse kinematics (IK) solver; and
   controlling one or more operations using a microcontroller including an inter-integrated circuit (I2C) communications module and at least one general purpose input/output (GPIO) pin, wherein the microcontroller utilizes a communications protocol configured to enable exception processing, fault recovery, and device hot-swapping.

2. The virtual reality positional tracking method of claim 1, wherein each IMU includes a 9-degree of freedom IMU.

3. The virtual reality positional tracking method of claim 1, wherein three IMU/MCU pairs are located on each digit of the wearable glove.

4. The virtual reality positional tracking method of claim 1, wherein the communications protocol is configured to assign a unique address to each sensor.

5. The virtual reality positional tracking method of claim 3, wherein an additional IMU/MCU pair is located on a wrist area of the wearable glove.

6. The virtual reality positional tracking method of claim 1, wherein the wearable glove includes one or more light sources configured to communicate with an imaging device.

7. The virtual reality positional tracking method of claim 6, wherein the imaging device utilizes a real-time time-of-flight (TOF) calculation of one or more tracked points.

8. The virtual reality positional tracking method of claim 6, wherein the imaging device utilizes pulse encoded lighting to differentiate tracked points.

9. A wearable virtual reality positional tracking device comprising:
   a wearable glove; and
   a plurality of inertial measurement unit (IMU)/microcontroller unit (MCU) pairs wherein each pair is located on the wearable glove, wherein each IMU/MCU pair includes a sensor configured to obtain positional information and provide that positional information to an inverse kinematics (IK) solver, wherein three IMU/ MCU pairs are located on each digit of the wearable glove.

10. The wearable virtual reality positional tracking device of claim 9, wherein each IMU includes a 9-degree of freedom IMU.

11. The wearable virtual reality positional tracking device of claim 9, further comprising:
   a microcontroller including an inter-integrated circuit (I2C) communications module and at least one general purpose input/output (GPIO) pin.

12. The wearable virtual reality positional tracking device of claim 11, wherein the microcontroller utilizes a communications protocol configured to enable exception processing, fault recovery, and device hot-swapping.

13. The wearable virtual reality positional tracking device of claim 12, wherein the communications protocol is configured to assign a unique address to each sensor.

14. The wearable virtual reality positional tracking device of claim 9, wherein an additional IMU/MCU pair is located on a wrist area of the wearable glove.

15. The wearable virtual reality positional tracking device of claim 9, wherein the wearable glove includes one or more light sources configured to communicate with an imaging device.

16. The wearable virtual reality positional tracking device of claim 15, wherein the imaging device utilizes a real-time time-of-flight (TOF) calculation of one or more tracked points.

17. The wearable virtual reality positional tracking device of claim 15, wherein the imaging device utilizes pulse encoded lighting to differentiate tracked points.

* * * * *